Patented Oct. 4, 1932

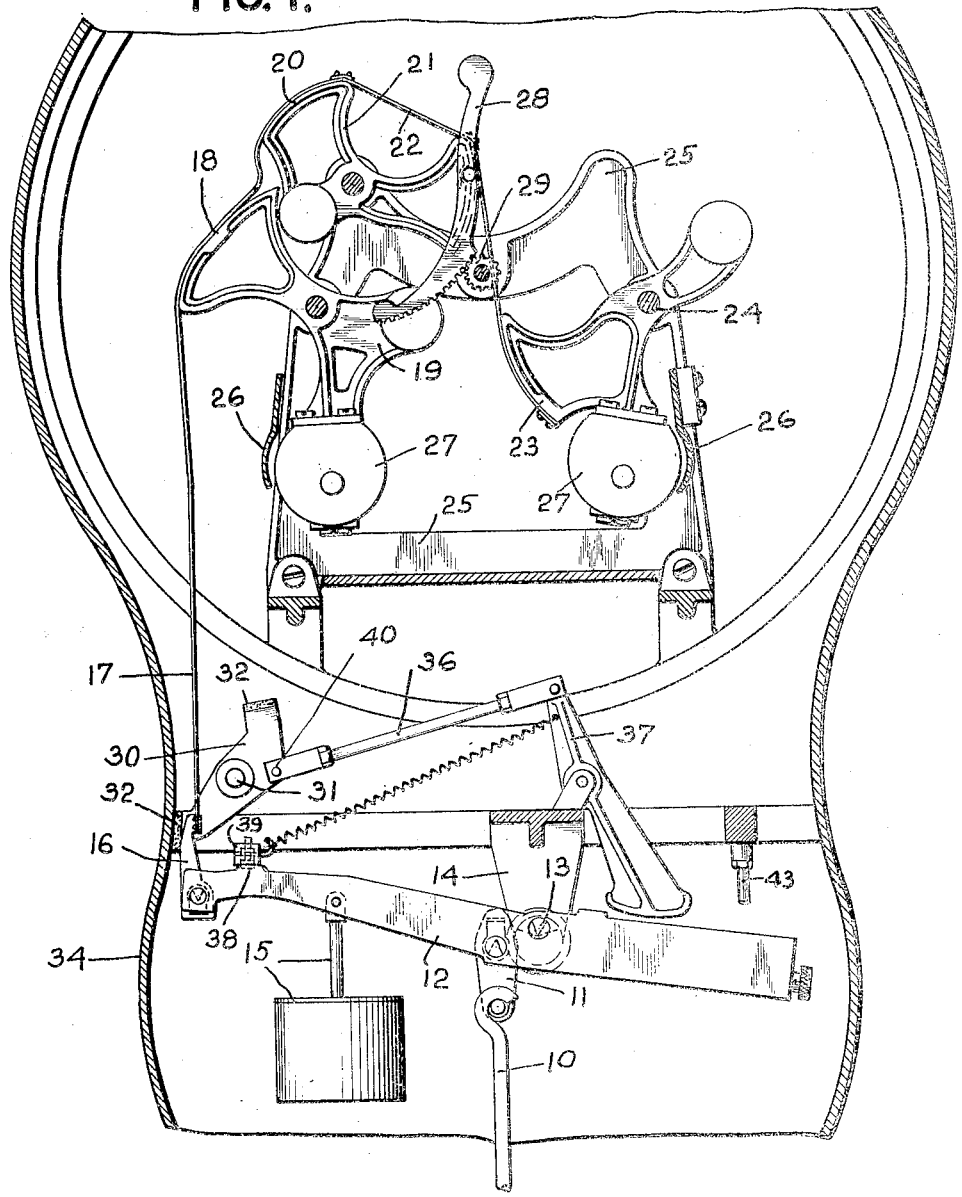

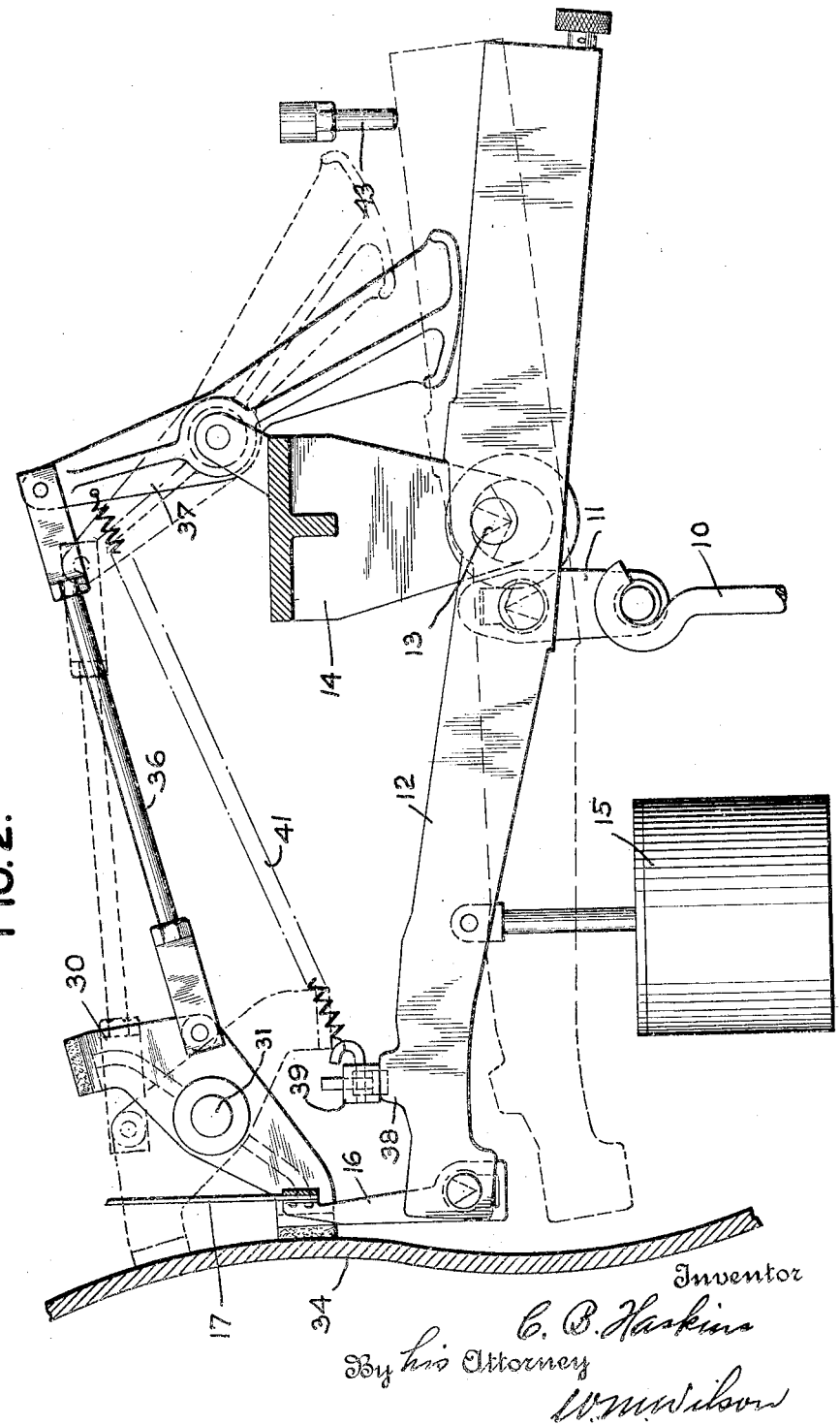

1,880,437

UNITED STATES PATENT OFFICE

CLIFFORD B. HASKINS, OF DAYTON, OHIO, ASSIGNOR TO DAYTON SCALE COMPANY, OF DAYTON, OHIO, A CORPORATION OF NEW JERSEY

SCALE LOCK

Application filed July 23, 1930. Serial No. 470,067.

This case relates to weighing scales and particularly to locking devices for use when transporting the scale or when it is otherwise desired to prevent movement of the scale parts.

The object of the invention is to provide an improved locking device for locking the levers of the scale against movement when not in use thereby preventing injury to the bearings of the levers due to shocks and disturbances such as occur in moving the scale.

Further the object of the invention is to combine such a locking means with a pendulum counterbalancing system in such a manner that the pendulums will be free to move in one direction.

Still further the object of the invention is to provide such a locking device in which the lever connected to the pendulums by means of a tape is locked in such a position that the strain on the tape is negligible.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a vertical section through a portion of the weighing machine, and

Fig. 2 is a detail of the locking device as applied to the intermediate lever.

In detail, the draft rod 10 connected to any suitable base lever system or load support engages a stirrup 11 having a knife edge bearing on the intermediate lever 12 fulcrumed at 13 on a frame piece 14. The usual dash pot device 15 is connected to the lever 12 to dampen the oscillations of the lever when the load is applied or removed from the scale. The left hand end of the lever 12, as viewed in Fig. 1, is connected to a stirrup element 16 attached to the lower end of the tape 17 the upper end of which engages and is fixed to the periphery 18 of the pendulum device 19 and to the periphery 20 of the intermediate transmission lever 21. A second tape 22 connects the lever 21 with the periphery 23 of the pendulum device 24. The counterbalancing system is supported by a frame 25 to the sides of which are fixed resilient arc-shaped elements 26 adapted to limit the movement of the pendulum balls 27 away from each other. Connected to the transmission lever 21 is a rack member 28 engaging a pinion 29 for driving the indicator (not shown).

The locking device consists of a bell lever 30 pivoted at 31 to the frame of the scale. Each end of the bell crank 30 is provided with cushioning material 32 adapted to engage the side of the scale housing 34. Eccentrically pivoted to the bell lever 30 is a link 36 pivoted at its other end to a lever 37, the lower end of which is adapted to engage the upper edge of lever 12 to prevent its rotation counterclockwise.

In the full line position shown in Figs. 1 and 2, the bell lever 30 has been rotated by means of a suitable crank handle located on the outside of the scale housing to the locking position. Thus the lever 12 which is normally in a substantially horizontal position has been actuated by the lever 37 clockwise until the lug 38 on the left hand arm of lever 12 engages fixed lug 39. In this position the pendulums 27 no longer exert any tension on the tape 17 and the pendulums 27 freely hang vertically. If during transportation, they swing outwardly, they engage resilient members 26. The lever 12 tends to remain in contact with lever 37 by the action of gravity. When in the full line position shown in the drawings the link 36 is located on a line, the extension of which passes below pivot 31 of the latter. Thus the tendency of the lever 12 to return to its initial position exerts a force tending to hold bell lever 30 in locked position. This action is further assisted by a spring 41 connecting lever 37 and fixed lug 39. In order to release the lever 12 from the lever 37, the bell lever 30 is rotated counterclockwise by means of the handle thereby moving the lever 37 counterclockwise and releasing it from the lever 12. The latter is thereby free to move under the impulses of the load to a limit determined by a pin 43.

When in unlocked position (as shown in dotted lines in Fig. 2) the link 36 is on a line, the extension of which passes above pivot 31 thus tending to hold the bell lever 30 in unlocked position.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a scale, a scale lever and locking means therefor comprising a bell lever, a link connected thereto, and a pivoted element connected to the link, the link being in a line to exert a force for holding the bell lever in locking position when the pivoted element has been positioned in engagement with the scale lever to lock the latter.

2. In a scale such as described in claim 1, and said link being in line for exerting a force tending to hold the bell lever in unlocked position when the pivoted element has been moved to unlock the scale lever.

3. In a scale, a scale lever, and locking means therefor including an element for engaging the scale lever and a bell lever for operating the element and having one end adapted to abut a fixed member when in locking position and the other end adapted to abut a fixed member when in unlocking position.

4. In a scale, a counterbalance system including a pendulum, operating means therefor, means for at will rendering the operating means ineffective to operate the pendulum, and a resilient member engageable with the pendulum when the latter swings to one side of its normal position.

5. In a scale, a scale lever, a toggle linkage including a pivoted element for locking the scale lever, said linkage being manually adjustable to lock or unlock the lever by means of said pivoted element, and a spring for urging the toggle linkage in a direction to hold it in either adjusted position.

6. In a scale, a tension member, a pendulum connected thereto, a beam connected to the tension member, a locking device for rocking the beam in a direction to decrease the pull thereof on the tension member and leave the pendulum free to rock free of the tension member, and a flexible stop for resiliently limiting the free rocking movement of the pendulum in one direction.

7. In a scale, a load-responsive beam, a pair of pendulum counterbalances, operating connections between the beam and the counterbalances for moving the latter in opposite directions upon a single movement of the beam, means for locking the beam in a position such that the connections release the pendulum counterbalances for free rocking movement, and a pair of stops, one coacting with each pendulum for limiting the rocking movement of said pendulum, the pendulums being in between the stops.

In testimony whereof I hereto affix my signature.

CLIFFORD B. HASKINS.